US012675536B1

(12) United States Patent
Pierce et al.

(10) Patent No.: US 12,675,536 B1
(45) Date of Patent: Jul. 7, 2026

(54) WEBSITE OBSERVER TOOL

(71) Applicant: Adswerve, Inc., Denver, CO (US)

(72) Inventors: Jeff Pierce, Sandy Hook, CT (US); Ben Fondell, Denver, CO (US); Obakeng Molebatsi, Bloemfontein (ZA); Johann de Jager, Pretoria (ZA); Dilan Vermaak, Centurion (ZA); Stacy Lavins, Denver, CO (US)

(73) Assignee: Adswerve, Inc., Denver, CO (US)

( * ) Notice: Subject to any disclaimer, the term of this patent is extended or adjusted under 35 U.S.C. 154(b) by 297 days.

(21) Appl. No.: 17/962,304

(22) Filed: Oct. 7, 2022

Related U.S. Application Data

(60) Provisional application No. 63/254,039, filed on Oct. 8, 2021.

(51) Int. Cl.
*G06F 16/951* (2019.01)
*G06F 16/9532* (2019.01)

(52) U.S. Cl.
CPC ........ *G06F 16/951* (2019.01); *G06F 16/9532* (2019.01)

(58) Field of Classification Search
CPC ........................... G06F 16/951; G06F 16/9532
See application file for complete search history.

(56) References Cited

U.S. PATENT DOCUMENTS

| | | | | | |
|---|---|---|---|---|---|
| 7,321,939 B1 * | 1/2008 | Porter | .................. | G06Q 10/107 |
| | | | | | 709/217 |
| 8,307,109 B2 * | 11/2012 | Mamou | .................. | G06F 16/254 |
| | | | | | 709/232 |

| | | | | | |
|---|---|---|---|---|---|
| 8,689,117 B1 * | 4/2014 | Vasilik | ................ | G06F 16/9577 |
| | | | | | 715/229 |
| 8,924,338 B1 * | 12/2014 | Sheng | ................. | G06F 16/1873 |
| | | | | | 706/52 |
| 9,069,885 B1 * | 6/2015 | Moeller | ............. | G06F 11/1448 |
| 11,354,440 B1 * | 6/2022 | Sanchez | ............. | G06F 11/3636 |
| 11,461,500 B2 * | 10/2022 | Brannon | ............... | G06Q 10/10 |
| 11,983,094 B2 * | 5/2024 | Downie | ............. | G06F 11/3698 |
| 2004/0068479 A1 * | 4/2004 | Wolfson | ................ | G06F 16/273 |
| 2007/0044069 A1 * | 2/2007 | Doucette | ................... | G06F 8/30 |
| | | | | | 717/106 |
| 2007/0094243 A1 * | 4/2007 | Kwak | ................... | G06F 16/951 |
| 2008/0184129 A1 * | 7/2008 | Cancel | .................. | G06Q 30/02 |
| | | | | | 715/741 |
| 2008/0189254 A1 * | 8/2008 | Cancel | .................. | G06Q 30/02 |
| 2010/0083098 A1 * | 4/2010 | Leme | ................... | G06F 16/958 |
| | | | | | 715/234 |

(Continued)

*Primary Examiner* — Mark E Hershley

(74) *Attorney, Agent, or Firm* — Lee & Hayes, P.C.

(57) ABSTRACT

A method and a system for auditing websites for compliance expectations are disclosed. A Website Observer Tool (WOT) may capture network message output (NMO) associated with a website; store the NMO in at least one of a storage device or storage platform; transform the NMO to create transformed output; load the transformed output to a database; aggregate at least part of data from the transformed output to create aggregated content in the database; execute a query to select data from the aggregated content; create a first condition for the NMO based on the selected data as a first expectation; and evaluate the NMO compared to the first expectation to monitor at least one of performance expectation of the website, privacy expectation of the website, or tagging expectation of the website.

20 Claims, 5 Drawing Sheets

(56)                    References Cited

U.S. PATENT DOCUMENTS

| | | | | |
|---|---|---|---|---|
| 2012/0036580 A1* | 2/2012 | Gorny | H04L 63/101 | 726/25 |
| 2013/0085804 A1* | 4/2013 | Leff | G06Q 30/0201 | 705/7.29 |
| 2013/0198376 A1* | 8/2013 | Landa | H04L 43/0876 | 709/224 |
| 2013/0208880 A1* | 8/2013 | Lovy | H04L 41/0213 | 379/265.03 |
| 2014/0046777 A1* | 2/2014 | Markey | G06Q 30/02 | 705/14.66 |
| 2014/0095427 A1* | 4/2014 | Fox | G06F 16/245 | 707/603 |
| 2014/0122235 A1* | 5/2014 | Agarwal | G06Q 30/0256 | 705/14.54 |
| 2014/0164342 A1* | 6/2014 | Liapis | G06F 16/9538 | 707/706 |
| 2014/0310591 A1* | 10/2014 | Nguyen | G06F 40/143 | 715/234 |
| 2014/0317754 A1* | 10/2014 | Niemela | G06F 21/6227 | 726/26 |
| 2015/0019323 A1* | 1/2015 | Goldberg | G06Q 30/0242 | 705/14.41 |
| 2015/0106078 A1* | 4/2015 | Chang | G06F 16/35 | 704/9 |
| 2015/0227533 A1* | 8/2015 | Goldstein | G06F 16/2379 | 707/661 |
| 2015/0278384 A1* | 10/2015 | Butt | G06F 16/972 | 715/234 |
| 2016/0019600 A1* | 1/2016 | Smith | G06Q 30/0201 | 705/7.29 |
| 2016/0164915 A1* | 6/2016 | Cook | G06F 21/6245 | 726/1 |
| 2016/0255161 A1* | 9/2016 | Lim | G06Q 30/0207 | 455/456.3 |
| 2017/0006135 A1* | 1/2017 | Siebel | G06F 8/10 | |
| 2017/0126627 A1* | 5/2017 | Yang | H04L 63/20 | |
| 2017/0322986 A1* | 11/2017 | Fora | G06F 16/254 | |
| 2017/0323026 A1* | 11/2017 | Le Bras | G06F 16/2358 | |
| 2017/0330107 A1* | 11/2017 | Gonzalez Sanchez | G06N 20/10 | |
| 2017/0357624 A1* | 12/2017 | Punjabi | G06F 40/103 | |
| 2018/0123921 A1* | 5/2018 | O'Connell | H04L 43/045 | |
| 2018/0341956 A1* | 11/2018 | Everhart | G06Q 30/0201 | |
| 2018/0365253 A1* | 12/2018 | Francis | G06F 16/9535 | |
| 2019/0012624 A1* | 1/2019 | Prabhakar | G06Q 10/0637 | |
| 2019/0122258 A1* | 4/2019 | Bramberger | G06Q 30/0248 | |
| 2019/0266280 A1* | 8/2019 | Acampado | G06F 16/3329 | |
| 2019/0317977 A1* | 10/2019 | Butt | G06Q 30/02 | |
| 2019/0377817 A1* | 12/2019 | McCluskey | G06F 16/258 | |
| 2020/0294128 A1* | 9/2020 | Cella | H04L 9/3239 | |
| 2020/0372205 A1* | 11/2020 | Bradley | G06F 40/134 | |
| 2020/0401431 A1* | 12/2020 | Rashid | G06F 9/45512 | |
| 2021/0021638 A1* | 1/2021 | Lancioni | H04L 63/1433 | |
| 2021/0176047 A1* | 6/2021 | Barnes | G06F 21/64 | |
| 2021/0342836 A1* | 11/2021 | Cella | G06N 20/00 | |
| 2022/0108262 A1* | 4/2022 | Cella | G06Q 10/063118 | |

* cited by examiner

Figure 1:
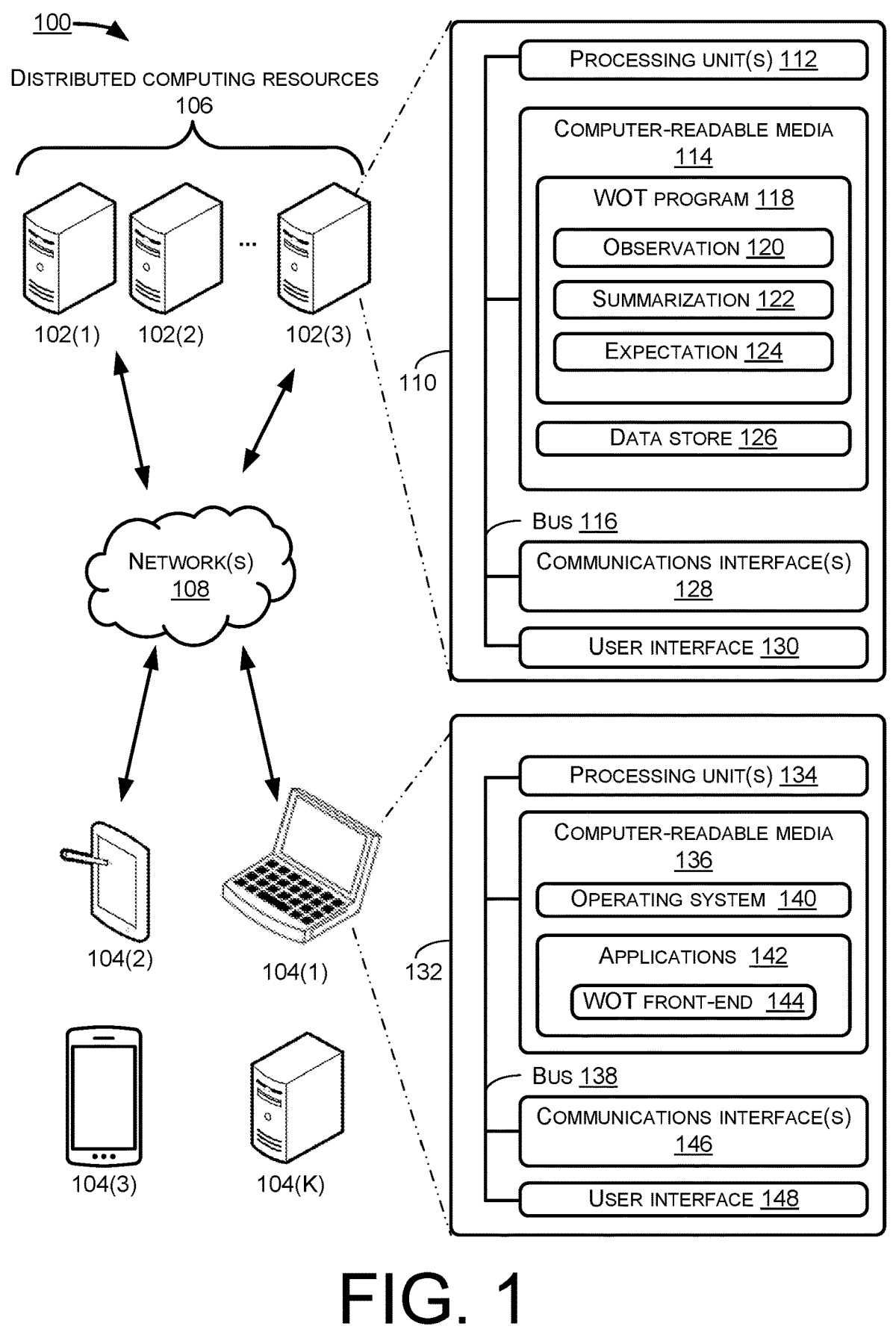

100 ➔

DISTRIBUTED COMPUTING RESOURCES
106

102(1)   102(2)   ...   102(3)

110

NETWORK(S)
108

104(2)          104(1)          132

104(3)          104(K)

PROCESSING UNIT(S) 112

COMPUTER-READABLE MEDIA
114

WOT PROGRAM 118

OBSERVATION 120

SUMMARIZATION 122

EXPECTATION 124

DATA STORE 126

BUS 116

COMMUNICATIONS INTERFACE(S)
128

USER INTERFACE 130

PROCESSING UNIT(S) 134

COMPUTER-READABLE MEDIA
136

OPERATING SYSTEM 140

APPLICATIONS 142

WOT FRONT-END 144

BUS 138

COMMUNICATIONS INTERFACE(S)
146

USER INTERFACE 148

WEBSITE OBSERVER TOOL

CROSS-REFERENCE TO RELATED APPLICATIONS

This application is a non-provisional of, and claims priority to and the benefit of, U.S. Provisional Patent Application Ser. No. 63/254,039, filed Oct. 8, 2021, and entitled "WEBSITE OBSERVER TOOL," the entirety of which is incorporated herein by reference.

BACKGROUND

Often website changes unintentionally degrade website performance, violate website privacy expectation, and break tags associated with search-engine optimization (SEO). When these issues arise, the website owner can lose sales and may incur significant additional costs to repair the error, can inadvertently violate privacy laws, which can exact a cost on the owner's reputation, expose the owner to fines, and cause the owner to lose customers, and can break tags and other tools for website analytics, rendering them ineffective. Moreover, historically, data analysis included a process to extract, transform, and load (ETL), which was a lossy format since some data was stripped away before storage due to the historically high cost of data storage.

BRIEF DESCRIPTION OF TIE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an example environment in which a Web Observer Tool can be utilized.

DESCRIPTION

Figure 2:
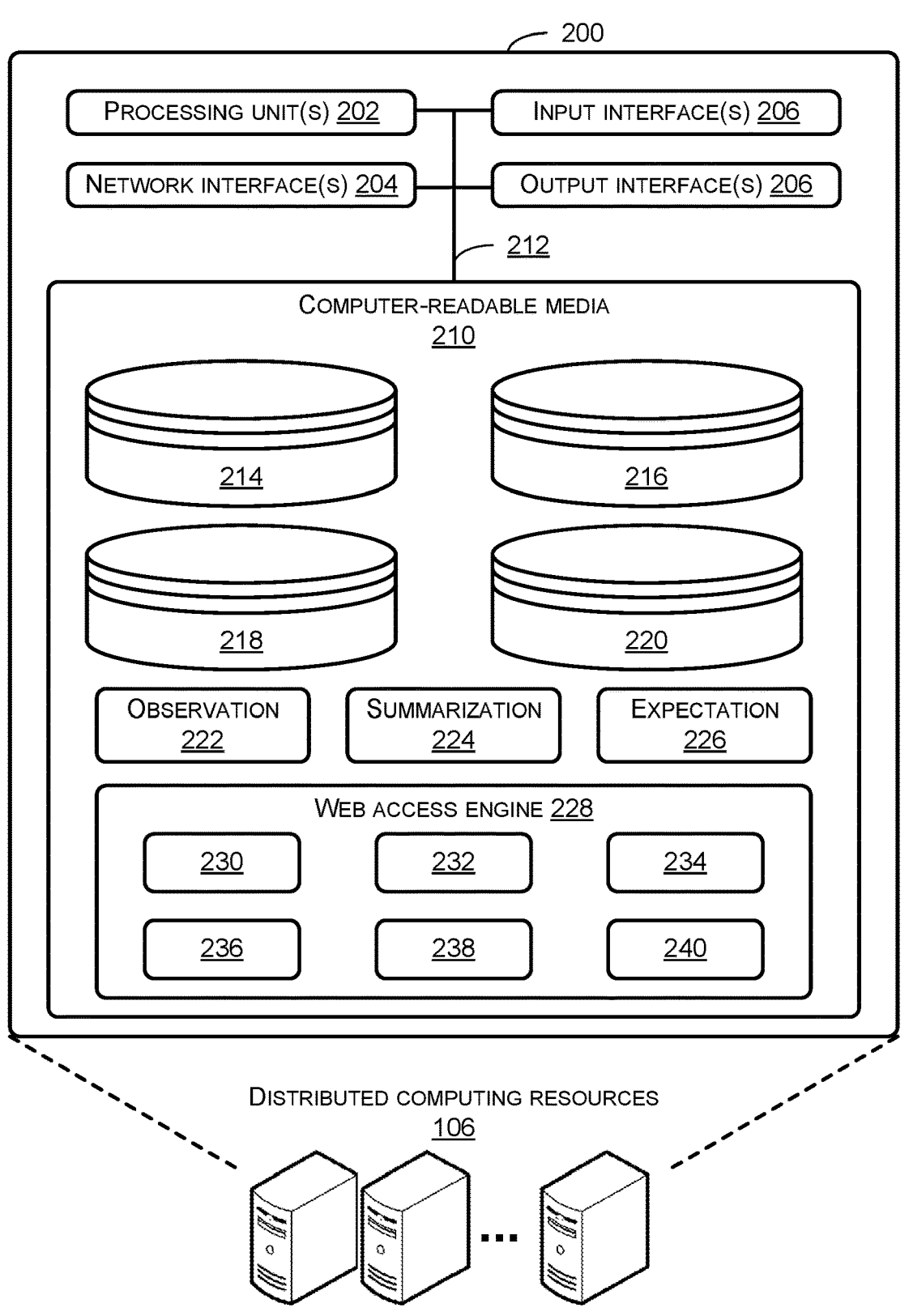
FIG. 2 is a block diagram depicting an example computing device configured to participate in a Website Observer Tool (WOT) system.

This application describes techniques, systems, methods, and computer-executable instructions on computer-readable media enabling a website observer tool ("WOT" or "tool") that can employ a browser, e.g., a web browser without a graphical user interface (aka "headless browser") to audit one or more selected websites for compliance with data expectations, identify issues with the website and associated data, and provide alerts when issues arise that can enable an entity to maintain website privacy expectations, maintain website performance expectations, and/or perform and compare robust analytics on website data without regard to changes to a website, including when such changes typically otherwise disable traditional analytics.

Various terms are used throughout this description with understanding and interpretation consistent with their plain meaning at the time the application is filed unless otherwise indicated. For example, the term "techniques," as used herein, can refer to system(s), method(s), computer-readable instructions, module(s), component(s), algorithms, hardware logic, and/or operation(s) as permitted by the context described above and throughout the document. In at least one example, as used herein, the term "link" refers to a uniform resource locator (URL) found on an observed web page, the term "observation" refers to snapshots, or images, of data created by the WOT during a visit to a website, such as network message outputs (NMOs) and/or web browser's outputs (WBOs), e.g., output files, hypertext markup language (HTML), dataLayer, network hits and/or events, image files, Network.requestWillBeSent message, Network.responseReceived message, Document Object Model, links, cookies, page events, etc. The snapshots can make up an observation according to the context of the observation, e.g., a website observation, an observation journey, etc. In various examples, the WOT can transform snapshots/images into data for an observation: as webpage loads, take a snapshot of the webpage, and save the html as a snapshot as it is rendered.

In at least one example, as used herein, an "observation job" refers to a batch or set of observations initiated by one event, e.g., executing a query, receiving data input, a mouse click, a timer, and in some examples, an observation job is complete when the WOT has evaluated the batch or set of observations. In at least one example, as used herein, an "observation crawl" refers to multiple observation jobs, starting with a page, and continuing until conditions are met, and in various examples, crawling can be automated to observe all or part of a website and/or configurable by an entity to observe particular paths through the website.

An entity, as used herein, refers to a user of the WOT. In various examples, the entity can include a user associated with a company conducting analysis associated with the WOT and/or providing services associated with the WOT, and/or the entity can include a user who purchases and/or licenses use of the WOT as a software-as-a-service (SAAS).

Various aspects of the technology are described further below in text and via accompanying images and drawings. The images and drawings are merely examples and should not be construed to limit the scope of the description or claims. For example, while examples are illustrated in the context of a user interface for a desktop-computing device, the techniques can be implemented using other computing devices such as laptop computers, tablet computers, hybrid computers, and/or smartphones, etc. The user interface can be adapted to the size, shape, and configuration of the particular computing device.

This application describes techniques and features that enable website-associated entities to identify a website for observation via the tool starting with a homepage. The tool can be configured to visit one or more webpages (aka "pages") of the website using a browser, e.g., a web browser without a graphical user interface (aka "headless browser" such as Puppeteer, Splash, SimpleBrowser, DotNetBrowser, etc.) to simulate a landing page experience and capture a snapshot of data associated with the process. WOT can instantiate and obtain/receive information from the browser, e.g., headless browser, save to cloud storage, transform, save to database/data warehouse, transform, and provide for presentation via user interface via the browser without performing network listening or sniffing.

The tool can extract, observe, and evaluate web pages, and in some examples, individual pages can be observed independently and concurrently. The tool can load the page into memory, render the page, capture an image of the page (e.g., a snapshot), record cookies, record links, record the rendered Document Object Model (DOM), e.g., hypertext markup language (HTML), record objects in memory, record traces of code execution, and record network and page events. In examples, the tool can save the data to a Google Cloud Platform (GCP), which can provide a cloud storage, such as Google Cloud Storage (GCS) for later processing, e.g., to a database or data warehouse such as Bigquery, etc. In some examples, completion of an observation via the tool can trigger an event associated with the completed observation, which can initiate summarization then evaluation of the data captured during observation. An example logic associated with data movement via the WOT includes ObservationRequestData. In various examples, a WOT as described herein can include a microservices architecture, a message bus, from which each function complete and function error can be recorded and observable. In at least one example, the WOT can use ObservationRequestData to control observation processes as described herein.

A specialized version of an observation herein termed a "journey" can build from observation of a website's landing page and adds interaction-based observations, including at least one associated event and snapshot. As used herein, a "journey" includes a landing page observation, and one or more interaction observations, which include an associated event and snapshot. In at least one example, completion of a journey triggers a journey complete event in the tool, which initiates summarization and/or evaluation of the data captured during the journey. An observation journey can include a webpage observation plus event(s) and snapshot(s) corresponding to the event(s), e.g., following the links on a webpage like a product page The tool can provide an interface to access stored observations, which can all viewing of previous observation(s) associated with a website akin to time travel to the observation at an indicated date and time.

This application describes techniques for an extract, load, transform (ELT) process. For example, data can be extracted, loaded into cloud storage, such as via google cloud storage, added to a database or data warehouse such as Bigquery, and transformed after being added to the database. In contrast to the historical approach of filtering/transforming as part of the acquisition process and then loading the filtered/transformed/reduced dataset into a database, which is a lossy process, techniques of the instant application enable storage of the data acquired in acquisition and transformation in the database compute space, which effects a lossless process. Example logic flow in an example process of the WOT can include one or more transforms. For example, a preprocessing transform, such as after data is extracted and loaded to GCS and before addition to the database, a preprocessing transform, such as after data has been added to the database and before presentation in an app, such as via views and tables.

In various examples, observations of websites can be scheduled and/or they can be triggered by events, e.g., on demand, responsive to a webhook, etc. Pages and journeys of a website can be observed on demand and/or observation can be scheduled via the tool. Individual pages, journeys, and/or categories of pages can be observed on demand and/or according to a schedule.

In at least one example, the website observer tool can be configured to produce an observation associated with performance of the website, e.g., timing of events associated with the website. In examples, the website observer tool can package up, and make useful and usable built-in functions of an automated tool for improving the quality of web pages in a browser, e.g., a web browser without a graphical user interface (aka "headless browser") such as Lighthouse in Puppeteer. In examples, the website observer tool can add contextual summarization, and historical comparisons. For example, completion of an observation associated with performance of the website can trigger an observation complete event, which can initiate evaluation of the data captured during the observation by the tool.

In at least one example, the website observer tool can be configured to produce an observation associated with privacy of the website, e.g., maintaining privacy of personal-user data associated with the website. In examples, the website observer tool can package up, and make useful and usable built-in functions of an automated tool for maintaining privacy of user data associated with web pages in a browser, e.g., a web browser without a graphical user interface (aka "headless browser") such as Lighthouse in Puppeteer. In examples, the website observer tool can provide a view of privacy-related data and corresponding expectations for observations.

In some examples, entities can add pages for observation by providing uniform resource locator(s) (URL(s)). In various examples, the website observer tool can receive one or more of individual URLs, lists of URLs, an indication to load a site map, e.g., an extensible markup language (XML) document, a selection of one or more pages with link(s) in observed pages, and/or instructions to crawl the website and gather URLs from the site. In various examples, the tool can receive and/or obtain data, pages, and events, from an analytics service such as Google analytics. The tool can be configured when crawling the website to exclude and/or include specific pages based at least on patterns in the URLs, and/or logic to recommend excluding one or more pages after observation. In at least one example, the tool can classify individual web pages according to one or more categories for expectation management. In at least one example, an entity can categorize a URL for expectation management, such as when adding the URL to the tool. The tool can provide a default category, e.g., AllPages, Default, etc., to which every page can be assigned. In various examples, the tool and/or the entity can create additional categories and/or assign pages to the additional categories. In at least one example, the number of categories to which a page can be assigned is not limited.

In examples the tool can provide a view of observed data, which can be organized and/or filtered by one or more of brand platform, hit type, tag type, etc. The tool can make one or more instances of the view available to the entity and/or other users including hit data by URL. The tool can cause the view to display a number of URLs with an associated tag type based on hits identified for a URL. In some examples, when there are no hits for an identified tag type, the tool can cause the view to display the number of URLs without hits. In various examples, the tool can receive input from the entity or another user instructing the tool to filter the data by page category, brand, platform, tag type, URL, pages with tags, pages without tags, conditions within the data; e.g., contains and/or does not contain text and/or regular expressions, etc. In some examples, this input can be termed a condition. In at least one example, one or more conditions can be saved as expectations, which can be based on filtering data according to the received input.

In at least one example the website observer tool can compare data the tool has captured and/or processed to expectations, which in some instances can include default expectations. The tool can report the expectation as met or not met. In various examples, expectations can include, but are not limited to, whether an object was observed, and if observed, if the data associated with, and/or part of, a website has a particular structure and/or characteristic; e.g., contains, does not contain, matches, or does not match a regular expression, etc. For example, when websites are created, there can be options to apply standard expectations for one or more of site types, tag management, and/or event streams. Site types can include, but are not limited to, one or more of the following: basic websites, ecommerce sites, marketing lead generation sites, etc. In some examples, the tool can provide an interface for an entity to apply default sets of expectations based on site type. Tag management types can include, but are not limited to, one or more of the following: Google Tag Manager, Tealium, Adobe Launch, etc. Event streams can include, but are not limited to, one or more of the following: Google Analytics, New GA, Adobe, Segment, Facebook, etc.

In at least one example, the tool can perform observations separately from evaluating expectations. The tool can perform an evaluation of expectation based on output from at least one observation. In some examples, the tool can perform an evaluation of expectations for any observation. In various examples, the tool can be automatically triggered to perform an evaluation of expectations upon completion of an observation. In some examples, completion of an evaluation can trigger an evaluation complete event, which can initiate the tool producing a notification of results to be provided to the entity and/or other users, e.g., via a user interface.

In at least one example, to signify an error and/or as a default the tool can report an expectation as not met. In some examples, the tool can provide a warning when an expectation is not met, which may be more helpful. In various examples, an entity can assign a level of a plurality of levels of classification to one or more of the expectations. In some examples, an entity or another user can associate one or more particular classifications to one or more specific conditions. In various examples, the tool can execute one or more processes based on the level of classification.

In at least one example, when an expectation is missed and/or there is an error, the tool can generate an error communication in a user interface associated with the tool and/or send an active alert or notification via one or more communication platforms such as short message service (SMS) text messages, multimedia messaging service (MMS) text messages, email, SLACK and/or similar communication platforms, etc. In some examples, the tool can generate a warning for a discrepancy that may not reach the level of an error and can cause the warning to be highlighted in a user interface associated with the tool and/or send a warning alert or notification.

In at least one example, the tool can observe one or more objects to obtain associated data. Objects can include images, page events, HTML, dataLayer pushes, function calls (code traces), and/or network events such as requests, redirects, and/or responses, etc. In some examples, the tool can associate one or more network messages and/or event set(s) with expectations and/or page categories, can assemble events (requests, redirects, and/or responses), can extract metadata and payloads, and/or classify individual network messages and/or event set(s) by platform and/or event type. In various examples, the tool can categorize platform and/or event type based on data in, and/or associated with, network message(s), e.g., URL where the data is sent, data included in the payload, and/or the response, etc.

FIG. 1 shows an example environment 100 in which examples of a Website Observer Tool (WOT) system can operate and/or in which workflow methods associated with a WOT system such as those described herein can be performed. The illustrated environment includes computing device(s) 102(1)-102(N) (individually and/or collectively referred to herein with reference number 102), where N is any integer greater than and/or equal to 1. The computing device(s) 102 can include server(s) and/or desktop computer(s), for example. The illustrated environment also includes computing devices 104(1)-104(K) (individually and/or collectively referred to herein with reference number 104), where K is any integer greater than and/or equal to 1. In some examples, N=K; in other examples, N>K or N<K. The computing devices 104 can include, for example, laptop computer(s), tablet computer(s), hybrid computing device(s), and/or smart phone(s). Computing device(s) 102 and/or 104 can include a diverse variety of device categories, classes, and/or types and are not limited to any of the particular types of devices illustrated.

In the illustrated example, computing device(s) 102(1)-102(N) can be computing nodes of distributed computing resources 106, e.g., in a computing cluster, such as a cloud service such as MICROSOFT AZURE, VMWARE VCLOUD, RACKSPACE, Inc.'s OPENSTACK, AMAZON WEB SERVICES (AWS), IBM SMARTCLOUD, ORACLE CLOUD, etc. In the illustrated example, computing device(s) 104 can include consumer devices and in some instances can operate as clients of distributed computing resources 106 that can submit jobs to distributed computing resources 106 and/or receive job results from distributed computing resources 106. Computing devices 102(1)-102(N) in distributed computing resources 106 can, share resources, balance load, increase performance, and/or provide fail-over support and/or redundancy, etc. Computing devices 104 can additionally or alternatively operate in a cluster and/or grouped configuration via association with one or more user(s).

By way of example and not limitation, computing device(s) 102 can include, but are not limited to, server computers and/or blade servers such as Web servers, map/reduce servers and/or other computation engines, and/or network-attached-storage units (e.g., 102(1)). By way of example and not limitation, computing device(s) 104 can include, but are not limited to, laptop computers (e.g., 104(1)), tablet computers (e.g., 104(2)), tablet hybrid computers 104(3), desktop (e.g., 104(K)), and/or other telecommunication devices, desktop computers, and/or integrated components for inclusion in computing devices, appliances, and/or other computing device(s) configured to participate in and/or carry out a workflow method associated with a WOT system as described herein.

In some examples, as indicated, computing device(s), e.g., computing devices 102 and 104, can intercommunicate to participate in and/or carry out workflow methods associated with a WOT system as described herein. For example, a computing device 104 can be a query and/or data source and computing device 102 can host modules and/or components of a WOT system to store data, to be queried, and/or to provide workflow to manage website observations associated with performance, privacy, and/or tagging as described below with reference to, e.g., FIG. 10 and Appendices A, B, and C.

Different devices and/or types of computing devices 102 and 104 can have different needs and/or ways of interacting with distributed computing resources 106. For example, computing devices 104 can interact with distributed computing resources 106 with discrete request/response communications, e.g., for responses and/or updates to manage workflow related to insurance policies. Additionally, and/or alternatively, computing devices 104 can be query sources and/or data sources and can interact with distributed computing resources 106 with discrete and/or ongoing transmissions of data to be used as input to an activity index.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, 5G, and so forth), any combination thereof, etc. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, FIBRE CHANNEL switches and/or hubs, etc.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and/or one or more other standards, e.g., BLUETOOTH, cellular-telephony standards such as code division multiple access (CDMA), global system for mobile communication (GSM), 3rd Generation Partnership Project (3GPP) standards, such as long-term evolution (LTE) and/or new radio (NR), voice over internet protocols (VOIP), worldwide interoperability for microwave access (WiMAX), etc.

Different networks have different characteristics, e.g., bandwidth, latency, accessibility (open, announced but secured, and/or not announced), and/or coverage area. The type of network 108 used for any given connection between, e.g., a computing device 104 and distributed computing resources 106 can be selected based on these characteristics and on the type of interaction.

Still referring to the example of FIG. 1, details of an example computing device 102(3) are illustrated at inset 110. The details of example computing device 102(3) can be representative of others of computing device(s) 102. However, each of the computing device(s) 102 can include additional or alternative hardware components and/or software modules.

Illustrated computing device 102 can include one or more processing unit(s) 112, e.g., integrated electronic circuit(s)

operably connected to one or more computer-readable media 114, e.g., memories, such as via a bus 116. In some examples, a plurality of processing unit(s) 112 can exchange data through an internal interface bus (e.g., PCIe), rather than and/or in addition to network 108. While the processing unit(s) 112 are described as residing on the computing device 102(3), in this example, the processing unit(s) 112 can also reside on different computing device(s) 102 and/or 104 in some examples. In some examples, at least two of the processing unit(s) 112 can reside on different computing device(s) 102 and/or 104. In such examples, multiple processing unit(s) 112 on the same computing device 102 and/or 104 can use a bus 116 of the computing device 102 and/or 104 to exchange data, while processing unit(s) 112 on different computing device(s) 102 and/or 104 can exchange data via network(s) 108.

Processing unit(s) 112 can include one or more microprocessors, single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing unit(s) 112 include Field-Programmable Gate Arrays (FPGAs), Application-Specific Integrated Circuits (ASICs), Application-Specific Standard Products (ASSPs), System-on-a-Ship systems (SOCs), Complex Programmable Logic Devices (CPLDs), Digital Signal Processors (DSPs), and other types of customizable processors. For example, a processing unit 112 can represent a hybrid device, such as a device from ALTERA and/or XIL.INX that includes a CPU core embedded in an FPGA fabric. These and/or other hardware logic components can operate independently and/or, in some instances, can be driven by a CPU. In some examples, at least some of computing device(s) 102 and/or 104 can include a plurality of processing unit(s) 112 of multiple types. For example, the processing unit(s) 112 shown in computing device 102(3) can be a combination of one or more CPUs, GPGPUs, FPGAs, etc. Different processing unit(s) 112 can have different execution models, e.g., as is the case for graphics processing units (GPUs) and central processing unit (CPUs).

Computer-readable media described herein, e.g., computer-readable media 114, includes digital storage media also termed non-transitory computer-readable media, and/or communication media. Digital storage media includes tangible storage units such as volatile memory, nonvolatile memory, and/or other persistent and/or auxiliary computer storage media, removable and non-removable digital storage media implemented in any method and/or technology for storage of information such as computer-readable instructions, data structures, program modules, and/or other data. Digital storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to digital storage media also termed non-transitory computer-readable media, communication media can embody computer-readable instructions, data structures, program modules, and/or other data in a modulated data signal, such as a carrier wave, and/or other transitory transmission mechanism. As defined herein, digital storage media does not include communication media.

In some examples, computer-readable media 114 can store instructions executable by the processing unit(s) 112 that, as discussed above, can represent a processing unit incorporated in computing device 102. Computer-readable media 114 can additionally and/or alternatively store instructions executable by external processing units such as by an external central processing unit (CPU) and/or external processor of any type discussed herein. In some examples at least one processing unit 112, e.g., a CPU, graphics processing unit (GPU), and/or hardware logic device, can be incorporated in computing device 102, while in some examples at least one processing unit 112, e.g., one or more of a CPU, GPU, and/or hardware logic device, can be external to computing device 102.

Computer-readable media 114 can store, for example, computer-executable instructions of programs, and/or applications that are loadable and executable by processing unit(s) 112 such as an operating system and/or Website Observer Tool (WOT) program 118, and/or other modules. In various examples, computer-readable media 114 can store, computer-executable instructions of an observation module or component 120, which can configure the processing unit(s) 112 to perform extracting and/or loading, a summarization module or component 122, which can configure the processing unit(s) 112 to perform a transformation on data (e.g., preprocessing), and/or an expectation module or component 124, which can configure the processing unit(s) 112 to perform a transformation on data (e.g., postprocessing), each of which can be associated with a WOT program 118. In some examples not shown, one or more of the processing unit(s) 112 in one of the computing device(s) 102 and/or 104 can be operably connected to computer-readable media 114 in a different one of the computing device(s) 102 and/or 104, e.g., via communications interface and network 108. For example, program code to perform steps of flow diagrams herein, e.g., as described herein with reference to workflow management associated with the WOT program 118, can be downloaded from a computing device 102 operating as a server to a computing device 104 operating as a client, e.g., via the network 108, and executed by one or more processing unit(s) in computing device 104. For example, the computer-executable instructions stored on the computer-readable media 114 can upon execution configure a computer such as a computing device 102 and/or 104 to perform operations described herein with reference to the operating system and/or WOT program 118, and one or more of the observation module or component 120, the summarization module or component 122, and/or the expectation module or component 124.

Computer-readable media 114 can also store, for example, one or more datastore(s) 126. Datastore(s) 126 can include multiple disparate databases or data sources. For example, the WOT program can store and/or access digital records associated with insurance policies in one or more datastore(s) 126. In at least one example, the observation module or component 120, the summarization module or component 122, and/or the expectation module or component 124 associated with the WOT program 118 can perform data analysis and/or processing on input from the multiple disparate data sources to generate an integrated workflow of activities that are appropriate for completion by a user login associated with a role.

Bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof can operably connect one or more processing unit(s) 112 to one or more computer-readable media 114.

Computing device 102 can also include one or more communications interfaces 128 connected via the bus 116 to processing unit(s) 112 to enable wired and/or wireless communications between computing device(s) 102 and other networked computing devices 102 and/or 104 involved in workflow methods associated with a WOT program 118, and/or other computing device(s), e.g., over network(s) 108. Such communications interface(s) 128 can include one or more transceiver devices, e.g., network interface controllers (NICs) such as Ethernet NICs and/or other types of transceiver devices, to send and receive communications over a network. The processing unit(s) 112 can exchange data through respective communications interface(s) 128. In some examples, the communications interface 128 can include a PCI Express (PCIe) transceiver, and the network 108 can include a PCIe bus. In some examples, the communications interface 128 can include, but is not limited to, a transceiver for cellular (3G, 4G, 5G, and/or other), WI-FI, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other modules or components are omitted from the illustrated computing device 102(3).

As noted above, computer-readable media 114 of the computing device 102 can store an operating system and/or WOT program 118. In some examples, an operating system is not used (commonly referred to as a "bare metal" configuration). In some examples, the operating system and/or WOT program 118 can include modules or components that enable and/or direct the computing device 102 to receive data via various input interfaces (e.g., user controls, network and/or communications interfaces, memory devices, and/or sensors), and process the data using the processing unit(s) 112 to generate output. The operating system and/or WOT program 118 can further include one or more modules or components that present the output (e.g., display an image on an electronic screen, store data in memory, and/or transmit data to another computing device). The operating system and/or WOT program 118 can enable a developer or an engineer, to interact with the computing device 102 using a user interface. User interface(s) (UI)s described herein can include one or more of a graphical user interface (GUI), and audio user interface (AUI), and/or various other input/output interfaces generally referenced as UI including touch-input interfaces and the like. Additionally, the operating system and/or WOT program 118 can include modules or components that perform various functions generally associated with an operating system, e.g., storage management and internal-device management.

In some examples, computing device 102 can include a user interface 130 configured to permit a developer or an engineer responsible for computing device 102(3), distributed computing resources 106, environment 100 and/or an application administrator, to operate the WOT program 118 via associated modules and/or components such as a the observation module or component 120, the summarization module or component 122, and/or the expectation module or component 124 and/or to access the datastore(s) 126.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 112. Some examples of computer-readable media 136 are discussed above with reference to computer-readable media 114. For example, computer-readable media 136 can include one or more digital storage media or communications media. Some examples of bus 138 are discussed above with reference to bus 116.

Computer-readable media 136 can store, for example, computer-executable instructions of an operating system 140, and/or other modules, programs, and/or applications 142 that are loadable and executable by processing unit(s) 134. Other applications in applications 142 can be operable with a WOT front-end application 144. Some examples of operating system 140 are discussed above with reference to inset 110.

In some examples, the computing device 104 can be configured to communicate with distributed computing resources 106 and/or computing device(s) 102 via a communications interface 146. A WOT front-end application 144 on computing device 104 can enable management of one or more types of insurance policies. WOT front-end application 144 can send a query and/or send information to datastore 126 and can perform techniques associated with managing workflow. For example, the computing device 104 can transmit a request to distributed computing resources 106 and/or computing device(s) 102 for an integrated output of activities associated with insurance policies for completion. A WOT innovation as described can receive output from distributed computing resources 106 and/or computing device(s) 102 as input for presentation from WOT front-end-application 144 via communications interface 146. A WOT innovation as described can present a user interface 148 associated with the WOT front-end application 144 based on that input. In some examples, functions described herein can be shared between one or more computing device(s) 102 and one or more computing device(s) 104. For example, the computing device(s) 104 can operate an input layer of one or more neural network(s) and the distributed computing resources 106 and/or computing device(s) 102 can operate one or more hidden layers and/or output layers of one or more neural network(s). In some examples, the computing device(s) 104 can obtain parameters associated with managing insurance policies and the distributed computing resources 106 and/or computing device(s) 102 can perform optimization and/or filtering of associated activities using those parameters via an optimization and/or filtering algorithm associated with WOT program 118.

Computing device 104 can also include one or more communications interfaces 146 connected via the bus 138 to processing unit(s) 134 to enable wired and/or wireless communications between computing device(s) 104 distributed computing resources 106 and/or and other networked computing devices 102 and/or 104 involved in end-to-end RNN for joint language understanding and dialogue management, and/or other computing device(s), over network(s) 108. Some examples are discussed above with reference to communications interface(s) 128.

Computing device 104 can include a user interface 148. For example, computing device 104(4) can provide user interface 148 to control and/or otherwise interact with WOT front-end application 144, distributed computing resources 106, and/or computing devices 102. For example, processing unit(s) 134 can receive inputs e.g., typed and/or spoken queries, selections, and/or other input actions associated with managing insurance policies via user interface 148 and transmit corresponding data via communications interface(s) 146 to computing device(s) 102.

User interfaces 130 and/or 148 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, alight pen and/or light gun, a joystick controller, a voice input device such as a microphone, voice-recognition device, and/or speech-recognition device, a touch input device such as a touchscreen and/or a touch pad, a gestural and/or motion input device such as a depth camera, a grip sensor, an accelerometer, another haptic input, a visual input device such as one or more cameras and/or image sensors, a QR code or bar code scanner, and the like. User interfaces 130 and/or 148 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like.

FIG. 2 is a block diagram depicting an example computing device 200 configured to participate in a Website Observer Tool (WOT) system and workflow method according to various examples described herein. FIG. 2 illustrates an example configuration of components of a computing device 200, which can represent a computing device(s) 102, and which can be and/or implement a WOT system, device, and/or apparatus, according to various examples described herein. Example computing device 200 includes one or more processing unit(s) 202, network interface(s) 204, input interface(s) 206, output interface(s) 208, and computer-readable media 210. The components of computing device 200 are operatively connected, for example, via a bus 212. These components can represent corresponding components from device(s) 102 a, e.g., processing unit(s) 1002 can represent processing unit(s) 112, bus 212 can represent bus 116, etc.

In example computing device 200, processing unit(s) 202 can correspond to processing unit(s) 112, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In some examples, processing unit(s) 202 can include an on-board memory, e.g., a RAM and/or cache, not shown.

Network interface(s) 204, which can represent communications interface(s) 128, can represent, for example, network interface controllers (NICs) or other types of transceiver devices to send and receive communications over a network.

Input/output (I/O) interfaces 206 and 208 allow computing device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Computer-readable media 210 can correspond to computer-readable media 114 and can store instructions executable by the processing unit(s) 202. Computer-readable media 210 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in computing device 200, while in some examples one or more of a CPU, GPU, and/or accelerator is external to computing device 200.

In the illustrated example, computer-readable media 210 includes four federated datastores: 214, 216, 218, 220, any one or more of which can also be represented by datastore 126, FIG. 1. In various examples, datastores 214-220 represent datastores associated with individual entities and can include data storage such as a database, data warehouse, or other type of structured or unstructured data storage (e.g., a Structured Query Language, SQL, an RDS PostgreSQL database, and/or NoSQL database), a Dynamo database, an S3 storage, etc. In some examples, datastores 214-220 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Datastores 214-220 can store data for the operations of processes, applications, components, and/or modules stored in computer-readable media 210 and/or executed by processing unit(s) 202 and/or accelerator(s).

In at least one example, computing device 200 can implement one or more of an observation module, component, or processor 222, the summarization module, component, or processor 224, and/or the expectation module, component, or processor 226 and/or other processors. Computing device 200 can implement observation module, component, or processor 222 to operate dynamically. Observation module, component, or processor 222 can represent observation module or component 120, and can operate according to the description herein. Computing device 200 can also implement a summarization module, component, or processor 224, which generally operates with observation module, component, or processor 222. Summarization module, component, or processor 224 can represent summarization module or component 122, and can operate according to the description herein. Computing device 200 can also implement an expectation module, component, or processor 226, which generally operates with observation module, component, or processor 222 and/or summarization module, component, or processor 224. Expectation module, component, or processor 226 can represent expectation module or component 124.

In at least one example, computing device 200 can implement a web access engine 228. In various examples, web access engine 228 can represent the WOT program 118 and/or WOT front-end application 144, and can operate to provide access to a WOT system according to descriptions herein. Web access engine 228 can include one or more modules to provide associated interfaces. In examples, block 230-240 represent modules that can control interactions of the WOT.

Figure 3:
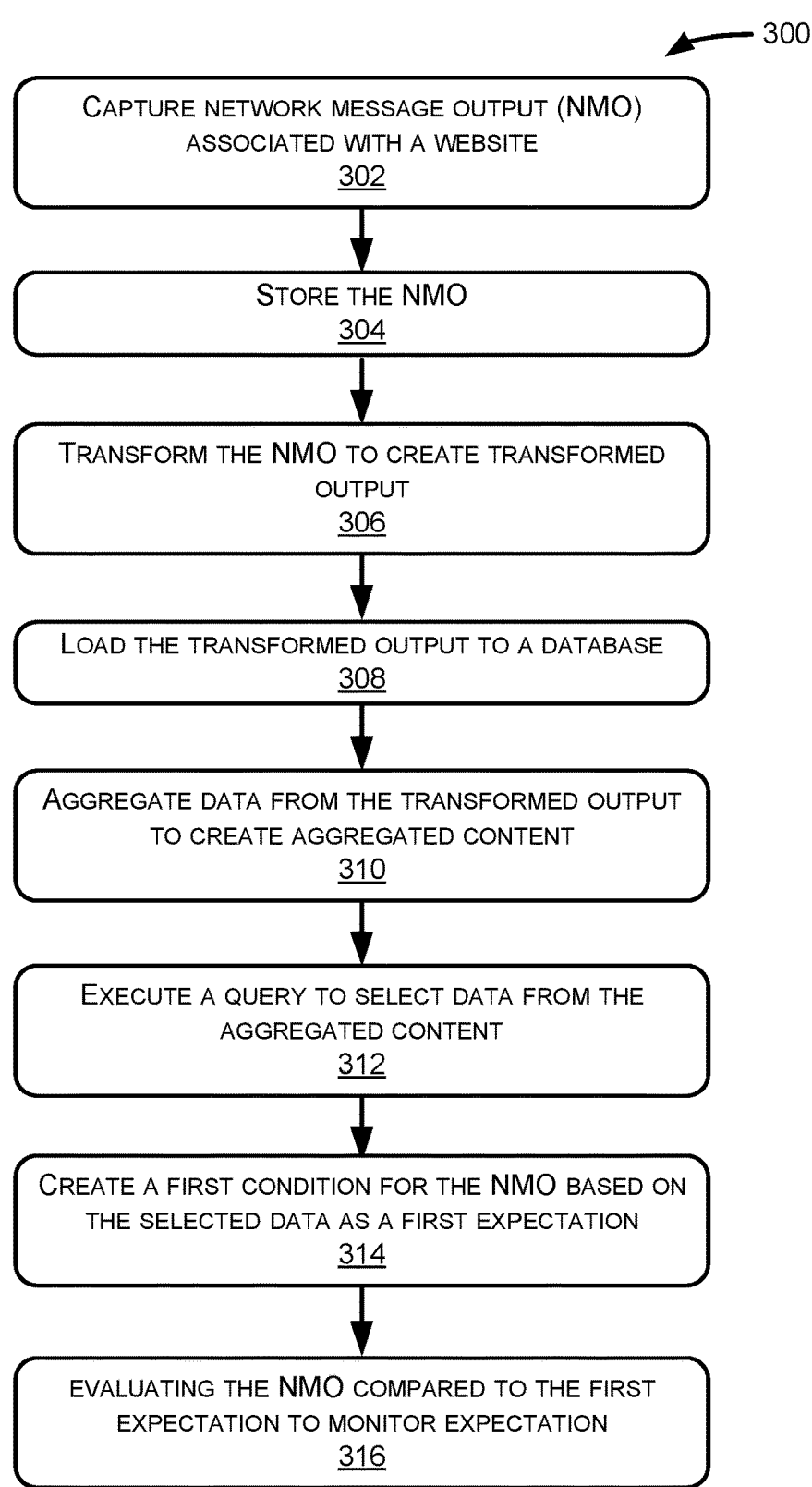
FIG. 3 is a flowchart illustrating an example process for the WOT expectation management.

FIG. 3 is a flowchart illustrating an example process 300 for Website Observer Tool (WOT) expectation management.

At block 302, a WOT, as described above with reference to FIGS. 1 and 2, can capture network message output (NMO) associated with a website, and store the NMO in at least one of a storage device or storage platform at block 304. In some examples, a WOT may omit capturing actual network requests and/or network responses, or capture but omit storing the actual network requests and/or network responses.

At block 306, a WOT can transform the NMO to create transformed output, and load the transformed output to a database at block 308. For example, a WOT, implemented in a computing device 102, can perform a preprocessing transform, such as after data is extracted and loaded to a cloud storage and before addition to the database, and/or a preprocessing transform, such as after data has been added to the database and before presentation in an app, such as via views and tables. At block 310, a WOT can aggregate at least a part of data from the transformed output to create aggregated content in the database, and execute a query, such as an SQL query, to select data from the aggregated content at block 312. A WOT can perform a full, or limited, search of the aggregated content for selecting the data from the aggregated content. A WOT can then create a first condition for the NMO based on the selected data as a first expectation at block 314, and evaluate the NMO compared to the first expectation to monitor one or more of expectations associated with the website at block 316. For example, a WOT can evaluate the NMO to monitor performance expectation of the website, privacy expectation of the website, and/or tagging expectation of the website.

Figure 4:
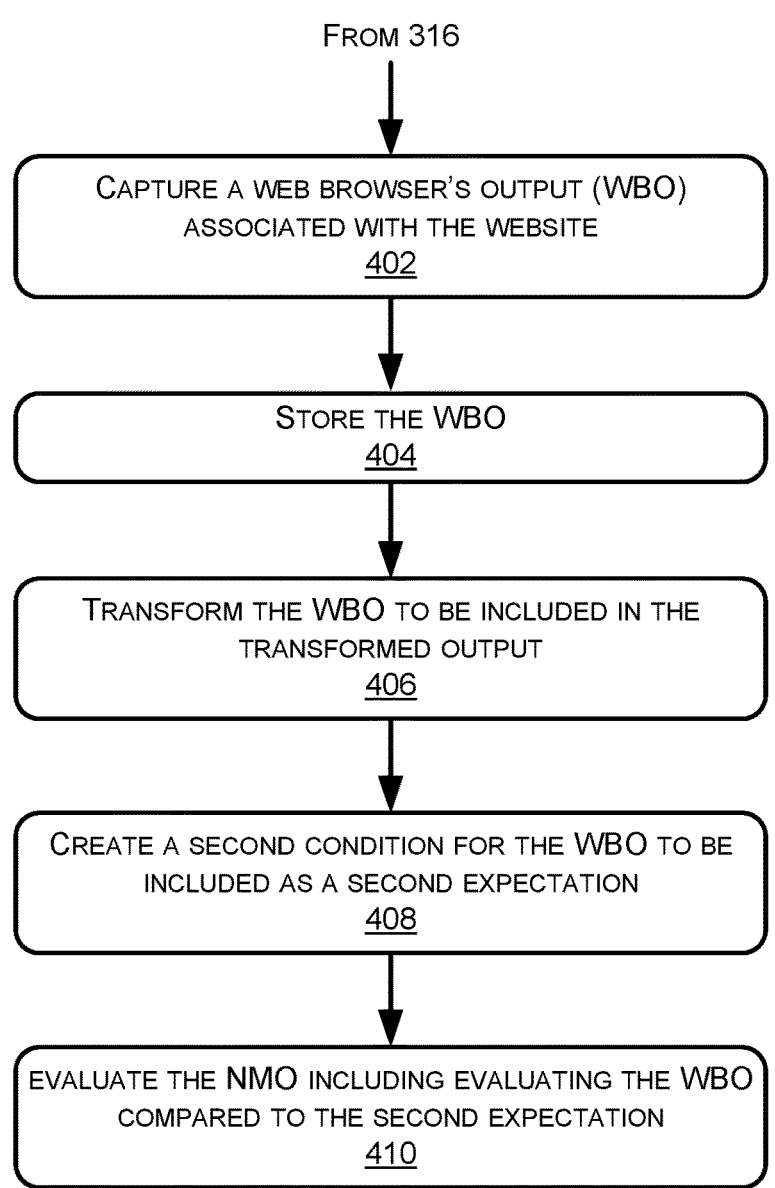
FIG. 4 is a flowchart illustrating an example additional process for the WOT expectation management.

FIG. 4 is a flowchart illustrating an example additional process 400 for a WOT expectation management. While the process 400 is illustrated as following the process 300 of FIG. 3, WOT expectation management may alternatively perform the process 400 concurrently with the process 300.

At block 402, a WOT, as described above with reference to FIGS. 1 and 2, can capture a web browser's output (WBO) associated with the website, and store the WBO in at least one of the storage device or the storage platform at block 404. A WOT, at block 406, can transform the WBO to be included in the transformed output, and create a second condition for the WBO to be included as a second expectation at block 408. At block 410, a WOT can evaluate the NMO by including evaluation of the WBO compared to the second expectation. As discussed above, the NMO and WBO can include a Network.requestWillBeSent message, a Network.responseReceived message, one or more cookies, one or more links, Document Object Model, one or more network events, one or more page events, etc.

Figure 5:
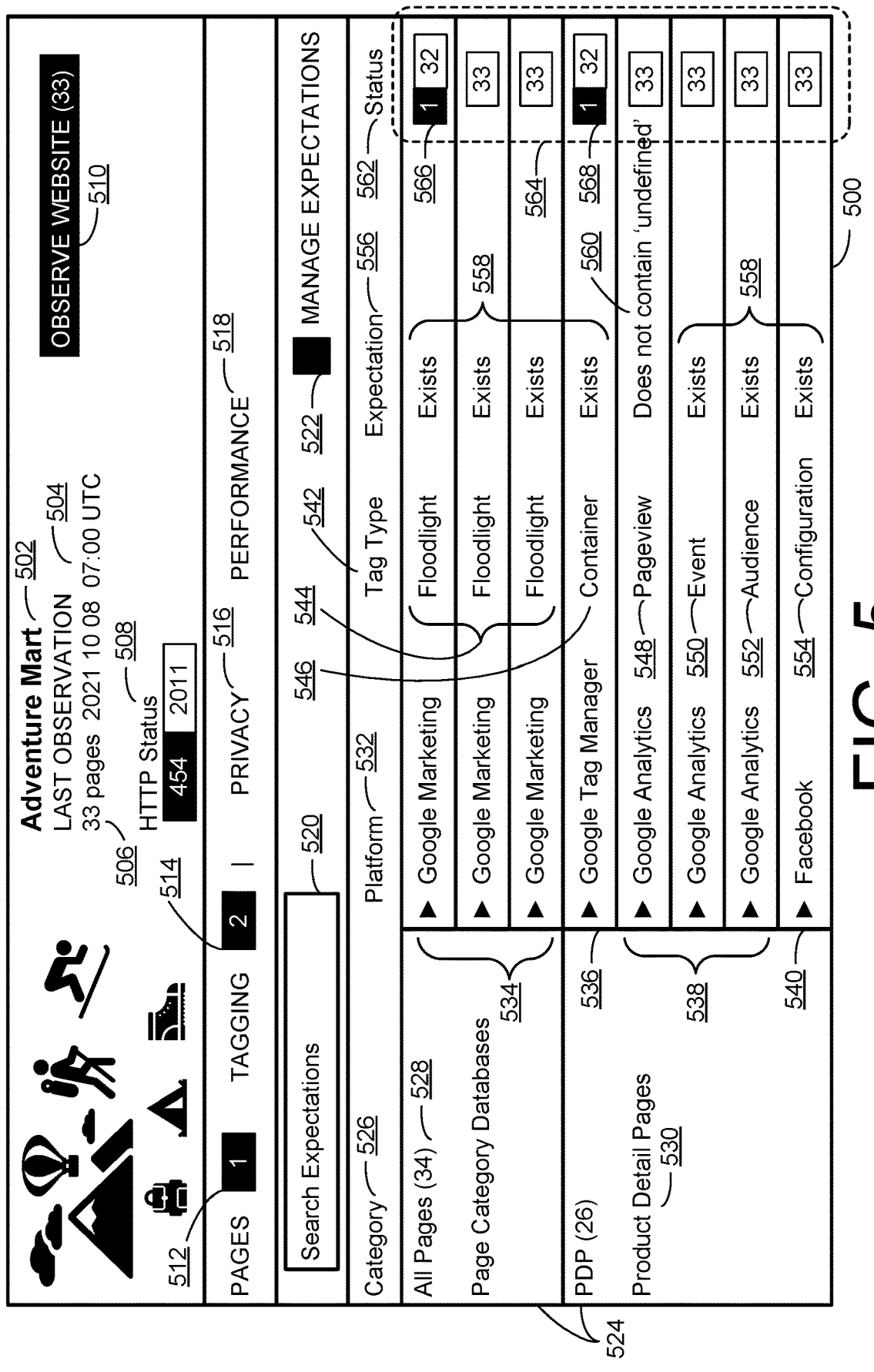
FIG. 5 is an example WOT UI presenting an observation for a subject.

The methods described herein are not limited to being performed using the systems and/or devices described regarding FIGS. 1-4 and can be implemented using systems and devices other than those described herein. AN EXAMPLE USE CASE One example use of the WOT described herein is when an entity, e.g., user, client, analyst, etc. wants to confirm that website changes have not broken existing analytical programs or processes. A graphical user interface can provide the flow that can configure a WOT as described herein to observe websites and associated pages, periodically and/or on demand. For example, the WOT can identify issues, e.g., identify data changes that do not meet expectations, and the WOT can provide an alert when data changes and/or when issues arise. FIG. 5 is an example WOT UI 500 presenting an observation for a subject.

WOT UI 500 may present an observation for a fictitious company 502, "Adventure Mart." The WOT UI 500 may include information pertinent to the observation including the time of observation 504, how many pages were accessed for the observation 506, the http status 508 of the website during the observation, the number of page observations remaining 510 within a selected period for the entity, the number of pages associated with an issue 512, the number of tags associated with an issue 514, that there are no issues related to privacy 516 or performance 518 identified for this website, an input box 520 to "search expectations" and a button 522 to "manage expectations," a table 524 showing the categories 526 "All Pages" 528 and "Product Detail Pages" 530, an excerpt of platforms 532 associated with the illustrated pages, e.g., "Google Marketing" 534, "Google Tag Manager" 536, "Google Analytics" 538, "Facebook" 540, associated Tag Types 542, e.g., "Floodlight" 544, "Container" 546, "Pageview" 548, "Event" 550, "Audience" 552, "Configuration" 554, Corresponding example Expectations 556, e.g., "Exists" 558, "Does not contain 'undefined'" 560, and a graphical Status summary 562 for each 564. In some examples, one or more of category, brand, tag type, expectation, can be user definable and/or can issue notification(s) representing expectation(s) being met, a warning, and/or an error. In the illustrated example, the "Exists" expectation associated with "Google Marketing Floodlight" and "Google Tag Manager Container" is not met for one page (566 and 568). 32 of 33 pages associated with the observed website, plus the landing page, meet all of the expectations illustrated, and 33 of 33 plus the landing page, meet the other tags associated with the illustrated platforms. In some examples, an expectation, e.g., the "Exists" expectation associated with "Google Marketing Floodlight" and "Google Tag Manager Container," can refer to the number of issues not met rather than the number of pages with issues not met. In some examples, an expectation, e.g., the "Exists" expectation associated with "Google Marketing Floodlight" and "Google Tag Manager Container," can refer to the number of pages having issues not met without regard to the number of issues associated with individual of the respective pages. In some examples, the WOT can omit identification and/or surfacing of issues related to privacy and/or performance for a website, based on entity specific criteria, and in some instance the options for their presentation can be presented inactive in the UI as a notification to the entity that observation(s) may be available related to privacy and/or performance.

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 112/134/202, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that can configure a processor to perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, etc., such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general-purpose computer(s) and/or processor(s) thereby reconfiguring the general-purpose computer(s) and/or processor(s) as special purpose computer(s) and/or processor(s) during their execution. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples need not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or any combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim or clause is a reference to at least some and not necessarily all of the items in the group of items, unless specifically stated otherwise. Furthermore, in some examples, any or all of the components can be implemented as one or more operating systems, as one or more stand-alone applications, as one or more modules of an application, as one or more plug-ins, as one or more library functions application programming interfaces (APIs) that can be called by other applications, and/or as a cloud-computing model.

Any trademarks or brand names reflected herein are property of their respective companies, and their inclusion herein is merely for illustrative purposes and should not be interpreted as an association or endorsement of the respective companies.

Although the discussion herein and accompanying figures and images set forth examples of the described techniques and technology, other architectures can be used to implement the described functionality and are intended to be within the scope of this disclosure. Furthermore, although the subject matter has been described in language specific to structural features and/or methodological acts, it is to be understood that the subject matter defined in associated claims is not necessarily limited to the specific features or acts described. Rather, the specific features and acts are disclosed as example forms and are intended to be within the scope of this disclosure.

We claim:

1. A method comprising:
capturing network message output (NMO) associated with a website, the NMO being a snapshot of data created during a visit to the website as a webpage of the website loads, the NMO including a hypertext markup language (HTML) of the webpage;
storing the NMO in at least one of a storage device or storage platform;
transforming the NMO to create transformed output;
loading the transformed output to a database;
aggregating at least part of data from the transformed output to create aggregated content in the database;
executing a query to select data from the aggregated content;
creating a first condition for the NMO based on the selected data as a first expectation; and
evaluating the NMO compared to the first expectation to monitor at least one of:
performance expectation of the website,
privacy expectation of the website, or
tagging expectation of the website,
wherein one or more webpages of the website is excluded from the aggregated content at least one of:
while crawling the website, or
based on evaluating the NMO compared to the first expectation.

2. The method of claim 1, wherein the NMO includes at least one of:
a Network.requestWillBeSent message, or
a Network.responseReceived message.

3. The method of claim 1, further comprising:
capturing a web browser's output (WBO) associated with the website;
storing the WBO in at least one of the storage device or the storage platform;
transforming the WBO to be included in the transformed output; and
creating a second condition for the WBO to be included as a second expectation,
wherein evaluating the NMO includes evaluating the WBO compared to the second expectation.

4. The method of claim 3, wherein the WBO includes at least one of:
one or more cookies,
one or more links,
Document Object Model,
one or more network events, or
one or more page events.

5. The method of claim 1, wherein capturing NMO includes omitting capturing at least one of:
actual network requests, or
network responses.

6. The method of claim 1, wherein storing the NMO in at least one of the storage device or storage platform includes omitting storing at least one of:
actual network requests, or
network responses.

7. The method of claim 1, further comprising:
limiting access for searching to the aggregated content.

8. The method of claim 7, further comprising:
performing a search of the aggregated content.

9. A computer-readable medium storing computer-executable instructions that, when executed by a processor, configure an associated computer to perform operations comprising:
capturing network message output (NMO) associated with a website, the NMO being a snapshot of data created during a visit to the website as a webpage of the website loads, the NMO including a hypertext markup language (HTML) of the webpage;
storing the NMO in at least one of a storage device or storage platform;
transforming the NMO to create transformed output;
loading the transformed output to a database;
aggregating at least part of data from the transformed output to create aggregated content in the database;
executing a query to select data from the aggregated content;
creating a first condition for the NMO based on the selected data as a first expectation; and
evaluating the NMO compared to the first expectation to monitor at least one of:
performance expectation of the website,
privacy expectation of the website, or
tagging expectation of the website,
wherein one or more webpages of the website is excluded from the aggregated content at least one of:
while crawling the website, or
based on evaluating the NMO compared to the first expectation.

10. The computer-readable medium of claim 9, wherein the NMO includes at least one of:
a Network.requestWillBeSent message, or
a Network.responseReceived message.

11. The computer-readable medium of claim 9, wherein the operations further comprise:

capturing a web browser's output (WBO) associated with the website;

storing the WBO in at least one of the storage device or the storage platform;

transforming the WBO to be included in the transformed output; and creating a second condition for the WBO to be included as a second expectation, wherein evaluating the NMO includes evaluating the WBO compared to the second expectation.

12. The computer-readable medium of claim 11, wherein the WBO includes at least one of:

one or more cookies, one or more links,

Document Object Model, one or more network events, or one or more page events.

13. The computer-readable medium of claim 9, wherein capturing NMO includes omitting capturing at least one of:

actual network requests, or network responses.

14. The computer-readable medium of claim 9, wherein storing the NMO in at least one of the storage device or storage platform includes omitting storing at least one of:

actual network requests, or network responses.

15. The computer-readable medium of claim 9, wherein the operations further comprise:

limiting access for searching to the aggregated content; and performing a search of the aggregated content.

16. A system comprising:

a processor; and a computer-readable medium storing computer-executable instructions that, when executed by the processor, configure an associated computer to perform operations comprising:

capturing network message output (NMO) associated with a website, the NMO being a snapshot of data created during a visit to the website as a webpage of the website loads, the NMO including a hypertext markup language (HTML) of the webpage;

storing the NMO in at least one of a storage device or storage platform;

transforming the NMO to create transformed output;

loading the transformed output to a database;

aggregating at least part of data from the transformed output to create aggregated content in the database;

executing a query to select data from the aggregated content;

creating a first condition for the NMO based on the selected data as a first expectation; and evaluating the NMO compared to the first expectation to monitor at least one of:

performance expectation of the website, privacy expectation of the website, or tagging expectation of the website, wherein one or more webpages of the website is excluded from the aggregated content at least one of:

while crawling the website, or based on evaluating the NMO compared to the first expectation.

17. The system of claim 16, wherein the operations further comprise:

capturing a web browser's output (WBO) associated with the website;

storing the WBO in at least one of the storage device or the storage platform;

transforming the WBO to be included in the transformed output; and creating a second condition for the WBO to be included as a second expectation, wherein evaluating the NMO includes evaluating the WBO compared to the second expectation.

18. The system of claim 16, wherein the NMO includes at least one of:

a Network.requestWillBeSent message, or a Network.responseReceived message, and wherein the WBO includes at least one of:

one or more cookies, one or more links,

Document Object Model, one or more network events, or one or more page events.

19. The system of claim 16, wherein capturing NMO includes omitting capturing at least one of:

actual network requests, or network responses.

20. The system of claim 16, wherein the operations further comprise:

limiting access for searching to the aggregated content; and performing a search of the aggregated content.

\* \* \* \* \*